United States Patent
Hamamoto et al.

(10) Patent No.: US 12,476,448 B2
(45) Date of Patent: Nov. 18, 2025

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Naoya Hamamoto, Yokkaichi (JP); Daisuke Hashimoto, Yokkaichi (JP); Takeshi Shimizu, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 118 days.

(21) Appl. No.: 18/693,748

(22) PCT Filed: Sep. 21, 2022

(86) PCT No.: PCT/JP2022/035222
§ 371 (c)(1),
(2) Date: Mar. 20, 2024

(87) PCT Pub. No.: WO2023/058459
PCT Pub. Date: Apr. 13, 2023

(65) Prior Publication Data
US 2024/0405536 A1    Dec. 5, 2024

(30) Foreign Application Priority Data
Oct. 5, 2021   (JP) .................................. 2021-164264

(51) Int. Cl.
H02G 15/013   (2006.01)
H01B 7/00     (2006.01)
(Continued)

(52) U.S. Cl.
CPC ......... H02G 15/013 (2013.01); H01B 7/0045 (2013.01); H01B 7/18 (2013.01); H02G 15/18 (2013.01)

(58) Field of Classification Search
CPC ........ H02G 15/013; H02G 15/18; H01B 7/18; H01B 7/0045; B60R 16/0215; H01R 4/18
See application file for complete search history.

(56) References Cited

U.S. PATENT DOCUMENTS

2020/0083695 A1   3/2020  Nakai
2021/0291757 A1   9/2021  Nakai

FOREIGN PATENT DOCUMENTS

| | | |
|---|---|---|
| JP | 2021-106210 A | 7/2021 |
| WO | 2019/216227 A1 | 11/2019 |
| WO | 2021/132031 A1 | 7/2021 |

OTHER PUBLICATIONS

Nov. 8, 2022 International Search Report issued in International Patent Application No. PCT/JP2022/035222.

*Primary Examiner* — Paresh Paghadal
(74) *Attorney, Agent, or Firm* — Oliff PLC (57) ABSTRACT

A wire harness that includes: a plurality of shielded electric wires that each have a core wire and an electromagnetic shield that covers an outer circumference of the core wire; a terminal where the plurality of core wires are connected to each other; an insulative cover that covers an outer circumference of the terminal; an underlay cover that covers an outer circumference of the insulative cover; a metal pipe that covers an outer circumference of the underlay cover; and a water sealing plug interposed between an inner circumfer- (Continued)

ential surface of an end of the metal pipe in a length direction and an outer circumferential surface of the shielded electric wires.

7 Claims, 4 Drawing Sheets

(51) Int. Cl.
*H01B 7/18* (2006.01)
*H02G 15/18* (2006.01)

WIRE HARNESS

BACKGROUND

The present disclosure relates to a wire harness.

There are conventional wire harnesses that include shielded electric wires each having a core wire and an electromagnetic shielding member that covers the outer circumference of the core wire, and in the wire harness, the core wires are connected to each other and the electromagnetic shielding members are connected to each other (see JP 2021-106210A, for example). This wire harness includes an insulative member that covers the outer circumference of a connection portion where core wires are connected to one another, and an electromagnetic shielding pipe that covers the outer circumference of the insulative member. The electromagnetic shielding members are disposed on the outer circumferential surface of the electromagnetic shielding pipe, and are covered by a swaging member from the outer circumference thereof and swaged and fixed to the electromagnetic shielding pipe. Also, this wire harness includes a resin pipe that covers the outer circumference of the swaging member, and water-sealing plugs that are interposed between inner circumferential surfaces of end portions of the resin pipe and the outer circumferential surfaces of the shielded electric wires, and the core wires and the electromagnetic shielding members are prevented from being exposed to water.

SUMMARY

While such a wire harness suppresses the radiation of electromagnetic waves from around the connection portion and ensures water proofing properties, a reduction in the number of components is desired.

An exemplary aspect of the disclosure provides a wire harness in which the number of components can be reduced.

A wire harness of the present disclosure including: a plurality of shielded electric wires that each have a core wire and an electromagnetic shield that covers an outer circumference of the core wire; a terminal where the plurality of core wires are connected to each other; an insulative cover that covers an outer circumference of the terminal; an underlay cover that covers an outer circumference of the insulative cover; a metal pipe that covers an outer circumference of the underlay cover; and a water sealing plug interposed between an inner circumferential surface of an end of the metal pipe in a length direction and an outer circumferential surface of the shielded electric wires, wherein the metal pipe has a shielding connection portion that protrudes inward in a radial direction to sandwich the electromagnetic shields together with the underlay cover while being connected to the electromagnetic shields, at an intermediate portion of the metal pipe in the length direction.

With the wire harness of the present disclosure, the number of components can be reduced.

DETAILED DESCRIPTION OF EMBODIMENTS

Description of Embodiments of Disclosure

First, embodiments of the present disclosure will be listed and described.

A wire harness of the present disclosure including:

(1) a plurality of shielded electric wires that each have a core wire and an electromagnetic shielding member that covers an outer circumference of the core wire; a connection portion where the plurality of core wires are connected to each other; an insulative member covering an outer circumference of the connection portion; an underlay member covering an outer circumference of the insulative member; a metal pipe covering an outer circumference of the underlay member; and a water sealing plug interposed between an inner circumferential surface of an end portion of the metal pipe in a length direction and an outer circumferential surface of the shielded electric wires, wherein the metal pipe has a shielding connection portion that protrudes inward in a radial direction to sandwich the electromagnetic shielding members together with the underlay member while being connected to the electromagnetic shielding members, at an intermediate portion of the metal pipe in the length direction.

With this configuration, the connection portion is covered by the metal pipe connected to the electromagnetic shielding members, and thus radiation of electromagnetic waves from around the connection portion is suppressed. Also, the connection portion and the electromagnetic shielding members are housed inside the metal pipe and the water sealing plug, and thus water proofing properties are ensured. The metal pipe serves both as a member for securing water proofing properties of the connection portion and the electromagnetic shielding members and as a member for connecting the electromagnetic shielding members to each other. Thus, the number of components can be reduced.

[2] It is preferable that the underlay member is installable from an outer side of the insulative member.

With this configuration, the underlay member is configured to be installable from the outer side of the insulative member, and for example, there is no need to pass the shielded electric wire through in advance as is the case with a cylindrical pipe, which makes for favorable assembly.

[3] It is preferable that the underlay member is flexible and has a C shape.

With this configuration, the insulative member can be inserted into the underlay member via the opening of the C shape while flexing the underlay member, and thus the underlay member can be easily installed from the outer side of the insulative member.

[4] It is preferable that the shielding connection portion forms a positioning portion restricting movement of the water sealing plug toward an intermediate portion of the metal pipe in the length direction.

With this configuration, the shielding connection portion also serves as a positioning portion. Thus, there is no need for a separate member for restricting movement of the water sealing plug toward the intermediate portion of the metal pipe in the length direction, and as such the number of components can be reduced.

[5] It is preferable that the water sealing plug is a rubber plug.

With this configuration, the inner circumferential surface of the metal pipe and the outer circumferential surface of the shielded electric wire can be favorably brought into close contact with each other, and water proofing properties can be favorably ensured.

[6] It is preferable that the wire harness further includes a retainer preventing dislodgement of the water sealing plug from the metal pipe.

With this configuration, dislodgement of the water sealing plug from the metal pipe is stably prevented by the retainer.

[7] It is preferable that the metal pipe has a retaining portion that protrudes inward in a radial direction on an end portion side of the metal pipe relative to the water sealing plug in the length direction and prevents dislodgement of the water sealing plug from the metal pipe.

With this configuration, dislodgement of the water sealing plug from the metal pipe is stably prevented by the retaining portion of the metal pipe. A retainer for preventing dislodgment of the water sealing plug from the metal pipe is not required, and thus the number of components can be reduced.

Details of Embodiment of the Present Disclosure

Specific examples of a wire harness of the present disclosure will be described with reference to the drawings. Some of the structures may be exaggerated or simplified in the drawings for sake of facilitating comprehension. Also, dimension ratios of portions may differ between diagrams. The terms "parallel", "orthogonal", and "perfectly circular" used in the present specification do not only refer to "parallel", "orthogonal", and "perfectly circular" in a strict sense, but are also inclusive of "substantially parallel", "substantially orthogonal", and "substantially perfectly circular" to the extent that operation and effects of the embodiments can be realized. Note that the present disclosure is not limited to these examples, but is indicated by the claims, and all changes that come within the meaning and range of equivalency of the claims are intended to be embraced therein.

Configuration of Wire Harness 11

Figure 1:
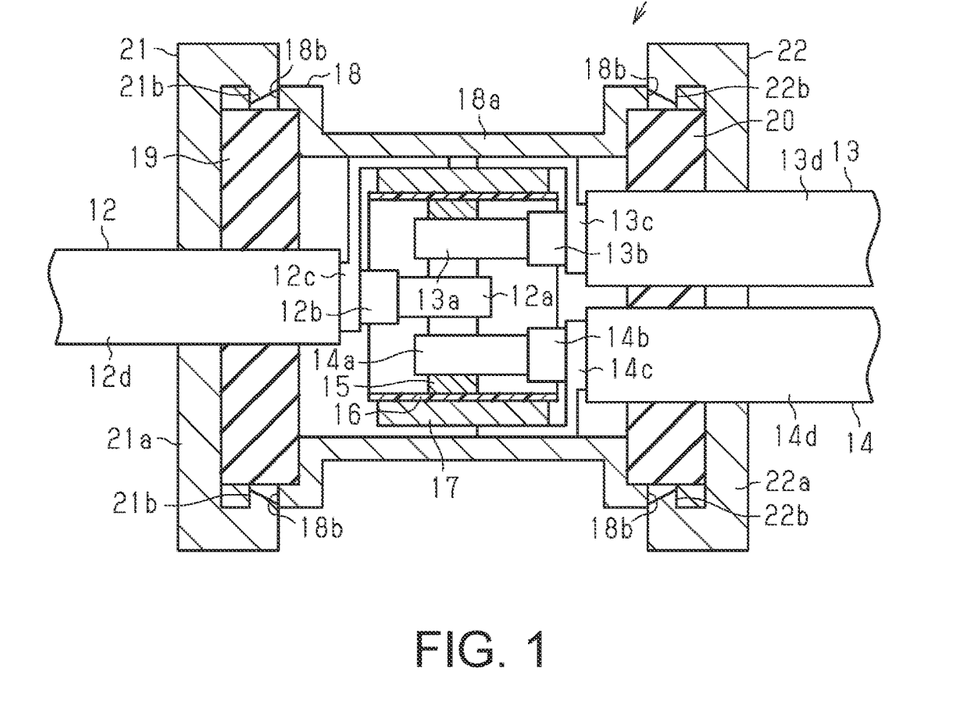
FIG. 1 is a schematic cross-sectional view showing of a portion of a wire harness according to one embodiment.

As shown in FIG. 1, a wire harness 11 includes a first shielded electric wire 12 serving as a shielded electric wire and two second shielded electric wires 13 and 14 serving as shielded electric wires. The first shielded electric wire 12 and the second shielded electric wires 13 and 14 respectively include core wires 12a to 14a serving as core wires, and inner insulative coatings 12b to 14b that cover the outer circumferences of the core wires 12a to 14a. Also, the first shielded electric wire 12 and the second shielded electric wires 13 and 14 respectively include electromagnetic shielding members 12c to 14c (electromagnetic shields) that cover the outer circumferences of the inner insulative coatings 12b to 14b, and outer insulative coatings 12d to 14d that cover the outer circumferences of the electromagnetic shielding members 12c to 14c.

The electromagnetic shielding members 12c to 14c suppress radiation of electromagnetic waves from the core wires 12a to 14a. The electromagnetic shielding members 12c to 14c of the present embodiment are braided wires formed by braiding conductive bare metal wires made of an aluminum alloy or the like into a tubular shape, for example.

The core wires 12a to 14a are provided exposed to the outside at end portions of the first shielded electric wire 12 and the second shielded electric wires 13 and 14. Also, the electromagnetic shielding members 12c to 14c are provided exposed to the outside at end portions of the first shielded electric wire 12 and the second shielded electric wires 13 and 14.

The outer insulative coatings 12d to 14d are stripped off first from the end portions of the first shielded electric wire 12 and the second shielded electric wires 13 and 14, after which the electromagnetic shielding members 12c to 14c are folded back, and then the inner insulative coatings 12b to 14b are stripped off. Accordingly, the electromagnetic shielding members 12c to 14c are exposed as are the core wires 12a to 14a. Note that electromagnetic shielding members 12c to 14c exposed to the outside can be folded back, bundled, or deformed, and are schematically shown in the drawings.

Also, the wire harness 11 includes a crimping terminal 15 (terminal) forming a portion of a connection portion, and an insulative member 16 (insulative cover).

Configuration of Crimping Terminal 15

The crimping terminal 15 is made from a conductive metal plate member, for example. The crimping terminal 15 is provided in a region where the core wires 12a to 14a exposed from the electromagnetic shielding members 12c to 14c of the respective first shielded electric wire 12 and the second shielded electric wires 13 and 14 are grouped together. The crimping terminal 15 connects the core wires 12a to 14a while collectively surrounding and being crimped to the core wires 12a to 14a. Note that the wire harness 11 is for electrically connecting a battery and two electric devices to each other, for example. The first shielded electric wire 12 and the second shielded electric wires 13 and 14 are provided such that, with the crimping terminal 15 being at the center, the first shielded electric wire 12 extends to one side (left side in FIG. 1) and the two second shielded electric wires 13 and 14 extend to the other side (right side in FIG. 1).

Configuration of Insulative Member 16

The outer circumference of the crimping terminal 15 is covered by the insulative member 16. The insulative member 16 is configured so as to be installable from the outer side of the crimping terminal 15. The insulative member 16 of the present embodiment is a piece of insulative tape and is wrapped around the crimping terminal 15. The insulative member 16 is provided so as to cover all of the core wires 12a to 14a exposed from the inner insulative coatings 12b to 14b. Note that the insulative member 16 is a piece of flexible insulative tape, and while it does not necessarily form a perfect cylindrical shape while wrapped around the crimping terminal 15, the insulative member 16 is schematically shown in FIG. 1 and the like as being cylindrical.

Also, the wire harness 11 includes an underlay member 17 (underlay cover), a metal pipe 18, water sealing plugs 19 and 20, and retainers 21 and 22.

Configuration of Underlay Member 17

The underlay member 17 covers the outer circumference of the insulative member 16. The underlay member 17 is made of metal. The underlay member 17 is configured to be installable from the outer side of the insulative member 16.

Figure 2:
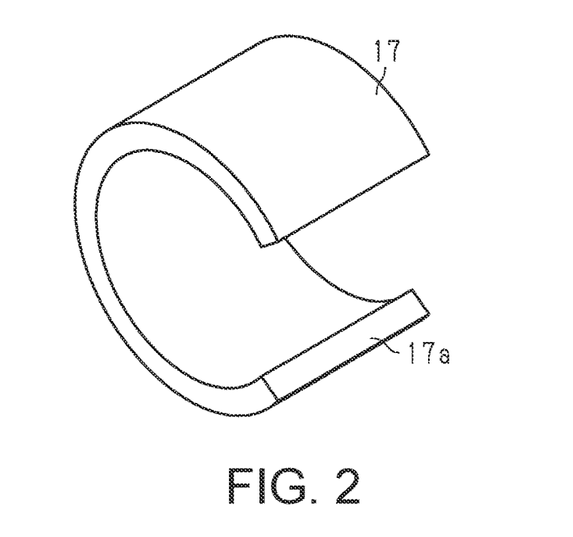
FIG. 2 is perspective view of an underlay member according to the embodiment.

Specifically, as shown in FIG. 2, the underlay member 17 has a C shape. In other words, the underlay member 17 has a shape obtained by cutting out a portion from a cylindrical shape in the circumferential direction. The underlay member 17 is flexible. The underlay member 17 is formed such that an opening 17a of the C shape can flex so as to spread apart, and the crimping terminal 15 and the insulative member 16 can move through the opening 17a of the C shape. Thus, the underlay member 17 can be installed at a position covering the outer circumference of the insulative member 16 from the outer side of the insulative member 16.

Figure 3:
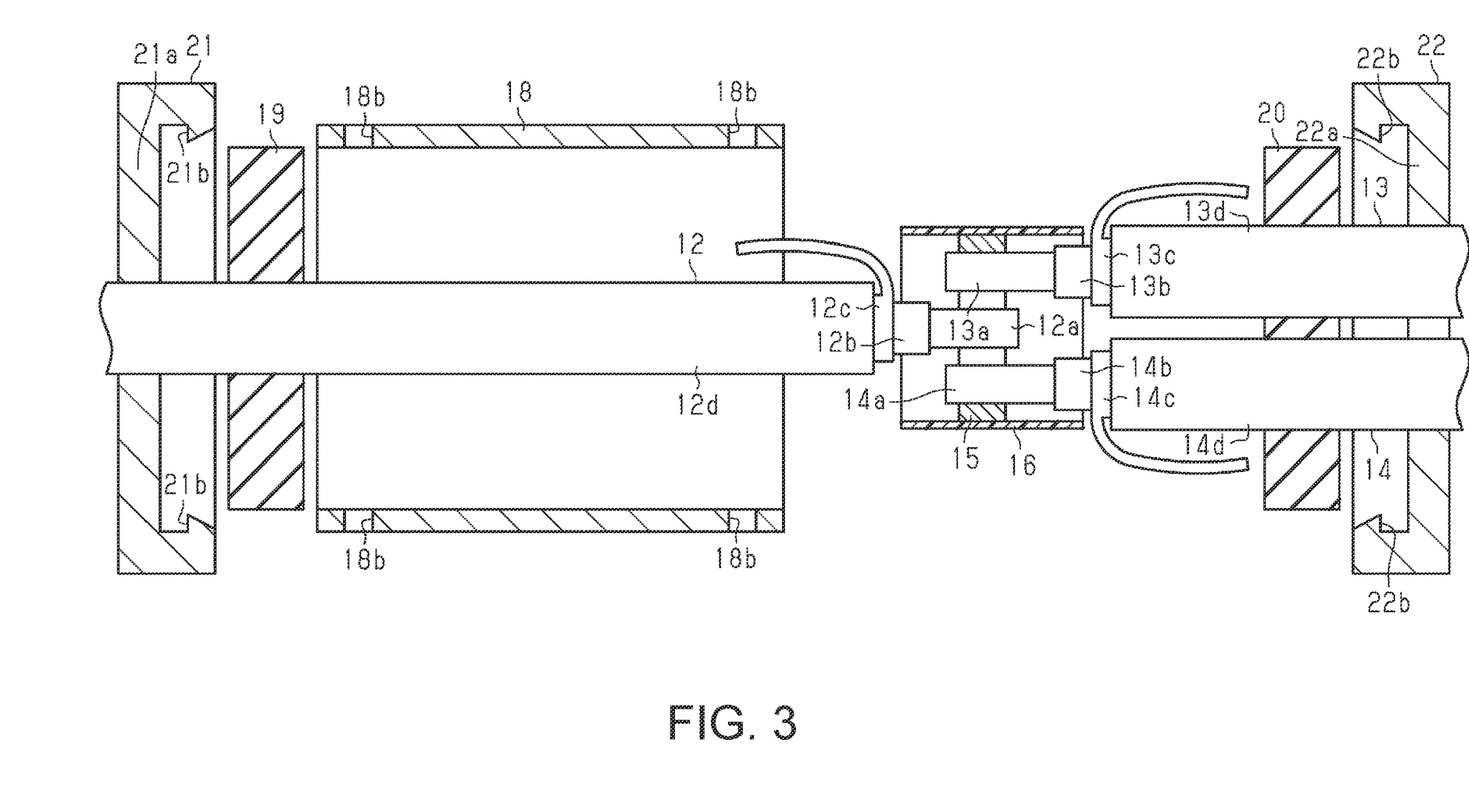
FIG. 3 is a schematic diagram for describing a manufacturing process of the wire harness according to the embodiment.
Figure 4:
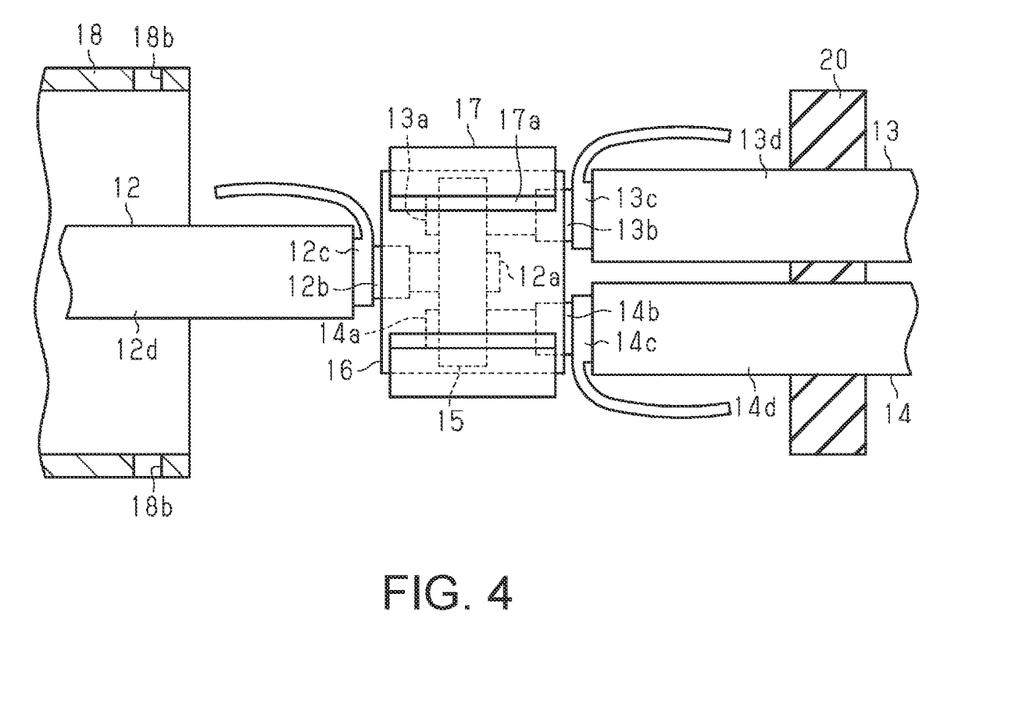
FIG. 4 is a schematic diagram for describing a manufacturing process of the wire harness according to the embodiment.

For example, as shown with the state shown in FIG. 3 to that shown in FIG. 4, in a state where the opening 17a of the C shape has flexed so as to spread apart, the insulative member 16 is passed through the opening 17a of the C shape to install the underlay member 17 at a position covering the outer circumference of the insulative member 16. Note that, in the states shown in FIGS. 3 and 4, the electromagnetic shielding members 12c to 14c exposed to the outside are folded away from one another while being grouped together.

Figure 5:
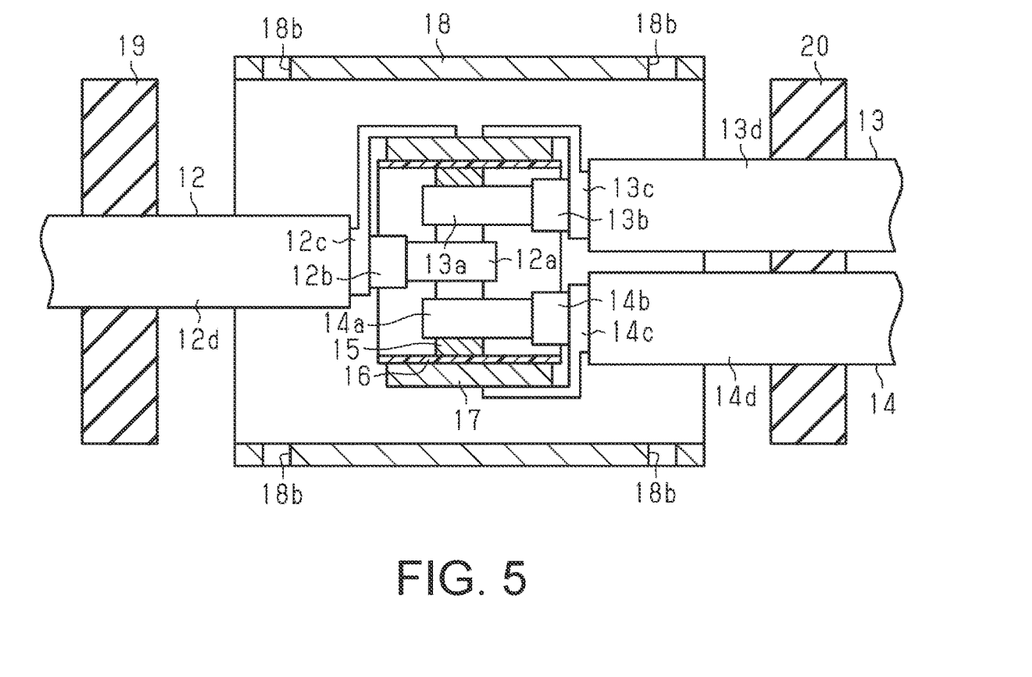
FIG. 5 is a schematic diagram for describing a manufacturing process of the wire harness according to the embodiment.

As shown in FIGS. 1 and 5, the electromagnetic shielding members 12c to 14c of the first shielded electric wire 12 and the second shielded electric wires 13 and 14 are disposed on the outer circumferential surface of the underlay member 17. The electromagnetic shielding members 12c to 14c of the present embodiment are braided wires as described above, and portions thereof are disposed on portions of the outer circumferential surface of the underlay member 17 that are located in the circumferential direction. That is, the underlay member 17 is assembled to the insulative member 16 in a state where the electromagnetic shielding members 12c to 14c are folded back as shown in FIGS. 3 and 4, and then the electromagnetic shielding members 12c to 14c are once again deformed so as to abut against the outer circumferential surface of the underlay member 17 as shown in FIG. 5.

Configuration of Metal Pipe 18

As shown in FIG. 1, the metal pipe 18 covers the outer circumference of the underlay member 17. The metal pipe 18 is made of a conductive metal such as an aluminum alloy, for example. The length of the metal pipe 18 along the extension direction of the wire harness 11 is set to be greater than the length of the underlay member 17. The metal pipe 18 has a shielding connection portion 18a that protrudes inward in the radial direction to sandwich the underlay member 17 and the electromagnetic shielding members 12c to 14c while being connected to the electromagnetic shielding members 12c to 14c, at an intermediate portion of the metal pipe 18 in the length direction.

Specifically, as shown in FIGS. 3 and 4, the metal pipe 18 has a cylindrical shape with a constant diameter in an un-processed state prior to the shielding connection portion 18a being formed. When crimping the crimping terminal 15 to the core wires 12a to 14a, the metal pipe 18 is disposed with the first shielded electric wire 12 passed through in advance so as to cover the outer circumference of the first shielded electric wire 12 while in the un-processed state. Then, as shown in FIG. 5, the metal pipe 18 is moved in the extension direction relative to the wire harness 11 to a position where the metal pipe 18 covers the electromagnetic shielding members 12c to 14c, in a state where the electromagnetic shielding members 12c to 14c are disposed so as to abut against the outer circumferential surface of the underlay member 17. Then, as shown in FIG. 1, the intermediate portion of the metal pipe 18 in the length direction is swaged inward in the radial direction to form the shielding connection portion 18a, and at the time of deformation, the shielding connection portion 18a sandwiches the electromagnetic shielding members 12c to 14c along with the underlay member 17.

Configuration of Water Sealing Plugs 19 and 20

The water sealing plugs 19 and 20 are rubber plugs made of rubber. The water sealing plugs 19 and 20 are respectively provided inside two end portions of the metal pipe 18 in the length direction. Specifically, the water sealing plug 19 is interposed between the inner circumferential surface of one end portion of the metal pipe 18 in the length direction and the outer circumferential surface of the first shielded electric wire 12, specifically the outer circumferential surface of the outer insulative coating 12d. The water sealing plug 20 is disposed between the inner circumferential surface of the other end portion of the metal pipe 18 in the length direction and the outer circumferential surfaces of the second shielded electric wires 13 and 14, specifically the outer circumferential surfaces of the outer insulative coatings 13d and 14d.

As shown in FIG. 3, when crimping the crimping terminal 15 to the core wires 12a to 14a, the water sealing plug 19 is disposed with the first shielded electric wire 12 passed therethrough, so as to cover the outer circumference of the first shielded electric wire 12 in advance. When crimping the crimping terminal 15 to the core wires 12a to 14a, the water sealing plug 20 is disposed with the second shielded electric wires 13 and 14 passed therethrough, so as to cover the outer circumferences of the second shielded electric wires 13 and 14 in advance. Then, as shown in FIG. 1, in a state where the metal pipe 18 is provided with the shielding connection portion 18a, the water sealing plugs 19 and 20 are moved in the extension direction relative to the wire harness 11 and placed inside the two end portions of the metal pipe 18. Movement of the water sealing plugs 19 and 20 toward the intermediate portion of the metal pipe 18 in the length direction is restricted by the shielding connection portion 18a. In other words, in the present embodiment, the shielding connection portion 18a forms a positioning portion that restricts movement of the water sealing plugs 19 and 20 toward the intermediate portion of the metal pipe 18 in the length direction.

Configuration of Retainers 21 and 22

The retainers 21 and 22 prevent dislodgement of the water sealing plugs 19 and 20 from the metal pipe 18. Specifically, each of the two end portions of the metal pipe 18 of the present embodiment have multiple locking holes 18b extending therethrough in the radial direction that are arranged in the circumferential direction. The retainers 21 and 22 each have disc-shaped body portions 21a and 22a that abut against surfaces of the water sealing plugs 19 and 20 located away from the metal pipe 18, and locking claws 21b and 22b that extend from outer edges of the main body portions 21a and 22a and fit into the locking holes 18b from the outside of the metal pipe 18 in the radial direction.

As shown in FIG. 3, when crimping the crimping terminal 15 to the core wires 12a to 14a, the retainer 21 is disposed with the first shielded electric wire 12 passed therethrough, so as to surround the outer circumference of the first shielded electric wire 12 in advance. The retainer 22 is disposed with the second shielded electric wires 13 and 14 passed therethrough, so as to cover the outer circumferences of the second shielded electric wires 13 and 14 in advance, when crimping the crimping terminal 15 to the core wires 12a to 14a. Then, as shown in FIG. 1, the retainers 21 and 22 are moved in the extension direction relative to the wire harness 11 and locked to two end portions of the metal pipe 18, in a state where the water sealing plugs 19 and 20 are disposed in the end portions of the metal pipe 18.

Next, operation of the wire harness 11 configured as described above will be described.

The first shielded electric wire 12 and the second shielded electric wires 13 and 14 have the electromagnetic shielding members 12c to 14c that cover the outer circumferences of the core wires 12a to 14a via the inner insulative coatings 12b to 14b. Thus, radiation of electromagnetic waves from the first shielded electric wire 12 and the second shielded electric wires 13 and 14 is suppressed. Also, the connection portion including the crimping terminal 15 connected to the core wires 12a to 14a is covered by the shielding connection portion 18a of the metal pipe 18. Thus, radiation of electromagnetic waves from around the connection portion is suppressed.

Next, effects of the embodiment are described below.

(1) The crimping terminal 15 forming a portion of the connection portion is covered by the metal pipe 18 connected to the electromagnetic shielding members 12c to 14c, and thus the radiation of electromagnetic waves from around the crimping terminal 15 is suppressed. Also, the crimping terminal 15 and the electromagnetic shielding members 12c to 14c are housed in the metal pipe 18 and the water sealing plugs 19 and 20, and thus water proofing properties can be ensured. The metal pipe 18 serves as a member for ensuring the water proofing properties of the crimping terminal 15 and the electromagnetic shielding members 12c to 14c, and as a member for connecting the electromagnetic shielding members 12c to 14c to each other. That is, a dedicated swaging member only for connecting the electromagnetic shielding members 12c to 14c to each other is used in a conventional technology, but no swaging member is required in the present embodiment. Thus, the number of components can be reduced.

(2) The underlay member 17 is configured so as to be insertable from the outer side of the insulative member 16, and for example, there is no need to pass the first shielded electric wire 12 through in advance as is the case with a cylindrical pipe, which makes for favorable assembly.

(3) The underlay member 17 is flexible and has a C shape. Thus, the insulative member 16 can be inserted into the underlay member 17 via the opening 17a of the C shape while flexing the underlay member 17, and thus the underlay member 17 can be easily installed from the outer side of the insulative member 16.

(4) The shielding connection portion 18a serves as a positioning portion that restricts movement of the water sealing plugs 19 and 20 toward the intermediate portion of the metal pipe 18 in the length direction. Thus, there is no need for a separate member for restricting movement of the water sealing plugs 19 and 20 toward the intermediate portion of the metal pipe 18 in the length direction, and as such the number of components can be reduced.

(5) The water sealing plugs 19 and 20 are rubber plugs. Thus, the inner circumferential surface of the metal pipe 18 and the outer circumferential surfaces of the outer insulative coatings 12d to 14d can be favorably brought into close contact with each other, and water proofing properties can be favorably ensured.

(6) Provided are the retainers 21 and 22 that prevent dislodgement of the water sealing plugs 19 and 20 from the metal pipe 18. Thus, dislodgement of the water sealing plugs 19 and 20 from the metal pipe 18 is stably prevented.

The present embodiment can be modified and implemented as follows. The present embodiment and the following modifications can be combined and implemented provided no technical contradiction arises.

In the above embodiment, the retainers 21 and 22 have the locking claws 21b and 22b that fit into the locking holes 18b from the outer side of the metal pipe 18 in the radial direction, but the present embodiment is not limited to this, and the retainers 21 and 22 may be locked to the metal pipe 18 using another configuration.

Figure 6:
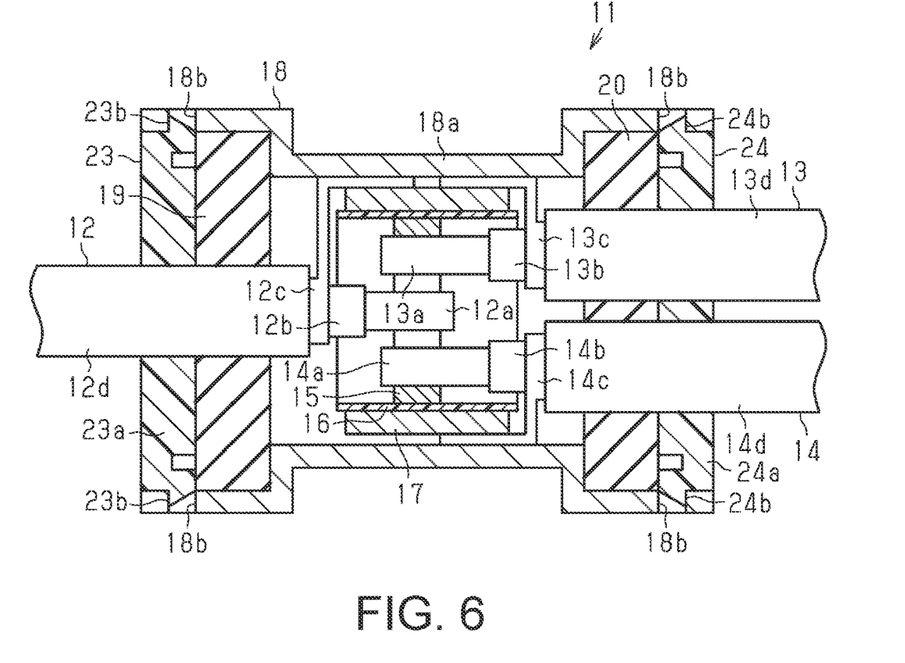
FIG. 6 is a schematic cross-sectional view of a portion of a wire harness according to another example.

For example, as shown in FIG. 6, a configuration may be employed where the retainers 23 and 24 have body portions 23a and 24a and locking claws 23b and 24b that extend from the outer edges of body portions 23a and 24a and are fitted into the locking holes 18b from the inner side of the metal pipe 18 in the radial direction.

In the above embodiment, the wire harness 11 includes the retainers 21 and 22, but a configuration not including the retainers 21 and 22 may be employed, provided that dislodgement of the water sealing plugs 19 and 20 from the metal pipe 18 can be prevented.

Figure 7:
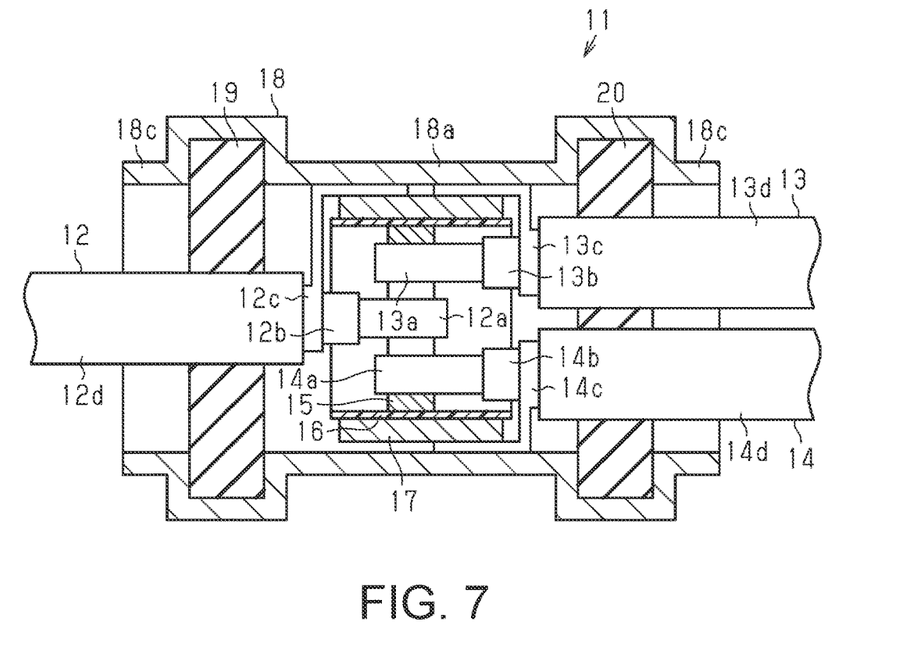
FIG. 7 is a schematic cross-sectional view of a portion of a wire harness according to the other example.

For example, as shown in FIG. 7, a configuration may be employed where the metal pipe 18 has retaining portions 18c that protrude inward in a radial direction on end portion sides of the metal pipe 18 relative to the water sealing plugs 19 and 20 in the length direction and prevent dislodgement of the water sealing plugs 19 and 20 from the metal pipe 18. Note that the retaining portions 18c are crimped portions that are formed through crimping or swaged portions formed by performing a swaging process, in a state where the water sealing plugs 19 and 20 are disposed inside the metal pipe 18.

With this configuration, the retainers 21 and 22 that prevent dislodgement of the water sealing plugs 19 and 20 from the metal pipe 18 are not required, and thus the number of components can be reduced.

In the present embodiment, a configuration was employed where the underlay member 17 has a C shape, and can be installed from the outer side of the insulative member 16, but the present embodiment is not limited to this, and a tubular pipe may be used as the underlay member 17, for example.

In the embodiment, the shielding connection portion 18a serves as a positioning portion that restricts movement of the water sealing plugs 19 and 20 toward the intermediate portion in the length direction of the metal pipe 18, but the present embodiment is not limited to this, and a positioning portion may be formed separate to the shielding connection portion 18a. For example, the positioning portion that restricts movement of the water sealing plugs 19 and 20 may be formed on the metal pipe 18 separately to the shielding connection portion 18a or formed as a separate member.

In the embodiment, the water sealing plugs 19 and 20 are rubber plugs, but the embodiment is not limited to this, and water sealing plugs made of a different material may be employed. For example, a resin water sealing plug that ensures water proofing properties with use of an adhesive may be employed.

In the embodiment, the insulative member 16 is a piece of insulative tape that is wrapped around the crimping terminal 15, but the embodiment is not limited to this, and the insulative member 16 may be changed to another insulative portion.

For example, the insulative member 16 of the embodiment may be changed to a cylindrical shrinkable tube. Note that the cylindrical shrinkable tube cannot be inserted from the outer side of the crimping terminal 15, and thus the first shielded electric wire 12 needs to be passed through the shrinkable tube in advance, for example.

In the embodiment, a configuration was employed where the wire harness 11 includes the first shielded electric wire 12 and the two second shielded electric wires 13 and 14, but a configuration including four or more shielded electric wires may be employed.

In the embodiment, a configuration was employed in which the connection portion to which the core wires 12a to 14a are connected has the crimping terminal 15, but the connection portion is not limited to this, and a configuration may be employed where the core wires 12a to 14a are welded to each other, for example. That is, a configuration may be employed where the connection portion has a welding portion in place of the crimping terminal 15.

As shown in FIGS. 1, 6, and 7, the shielding connection portion 18a is connected to the electromagnetic shielding members 12c to 14c, and thus the electromagnetic shielding members 12c to 14c may be connected to each other via the shielding connection portion 18a.

As shown in FIGS. 1, 6, and 7, the metal pipe 18 and the water sealing plugs 19 and 20 may form a structure for ensuring the water proofing properties of the crimping terminal 15 and the electromagnetic shielding members 12c to 14c.

As shown in FIGS. 1, 6, and 7, the surfaces of the water sealing plugs 19 and 20 facing the connection portion 15 may abut against the end surfaces of the shielding connection portion 18a in the longitudinal direction. Thus, movement of the water sealing plugs 19 and 20 toward the intermediate portion of the metal pipe 18 in the length direction is restricted. As shown in FIG. 7, the surfaces of the water sealing plugs 19 and 20 on the side opposite to the surfaces facing the connection portion 15 may respectively abut against the end surfaces of the retaining portions 18c opposing the connection portion 15. Thus, dislodgement of the water sealing plugs 19 and 20 from the metal pipe 18 is prevented.

As with the shown examples, the metal pipe 18 may have steps in the radial direction between the opening end portions of the metal pipe 18 and the shielding connection portion 18a of the metal pipe 18 in the length direction of the metal pipe 18. For example, in the examples shown in FIGS. 1, 6, and 7, the shielding connection portion 18a of the metal pipe 18 can be referred to as a small-diameter tubular portion that has a first diameter at an intermediate position or a first length position different from the two opening end portions of the metal pipe 18. As with the examples in FIGS. 1, 6, and 7, the metal pipe 18 can have a large-diameter tubular portion that has a second diameter larger than the diameter of the shielding connection portion 18a (first diameter) at a position adjacent to the shielding connection portion 18a in the length direction of the metal pipe 18. In the examples shown in FIGS. 1 and 6, the two opening end portions of the metal pipe 18 may be large-diameter portions of the metal pipe 18. As shown in the example in FIG. 7, the metal pipe 18 may have the retaining portions 18c that can be opening end portions of the metal pipe 18 and the shielding connection portion 18a that can be a small-diameter tubular portion, and have a large-diameter tubular portion located at a second length position between the retaining portions 18c and the shielding connection portion 18a, and the large-diameter tubular portion may unmovably hold the water sealing plugs 19 and 20 in an axial direction. The steps in the radial direction of the metal pipe 18 shown in the examples in FIGS. 1, 6, and 7 can be referred to as water sealing plug stoppers. The steps of the metal pipe 18 in the radial direction may come into liquid-tight contact with the outermost portion in the radial direction of the inward-facing surface of the corresponding water sealing plug 19 or 20 in the axial direction.

Supplementary Note 1

A wire harness (11) according to several aspects of the present disclosure, including:

a plurality of shielded electric wires (12 to 14) that each have a core wire (12a to 14a) and an electromagnetic shielding member (12c to 14c) that covers an outer circumference of the core wire (12a to 14a);

a connection portion (15) where the plurality of core wires (12a to 14a) are connected to each other;

an insulative member (16) covering an outer circumference of the connection portion (15);

an underlay member (17) covering an outer circumference of the insulative member (16);

a metal pipe (18) covering an outer circumference of the underlay member (17); and water sealing plugs (19 and 20) sealing a space between inner circumferential surfaces of two end portions of the metal pipe (18) in a length direction of the metal pipe (18) and an outer circumferential surface of the shielded electric wires (12 to 14), wherein leading end portions of the electromagnetic shielding members (12c to 14c) are disposed so as to abut against the outer circumferential surface of the underlay member (17), and the metal pipe (18) has a shielding connection portion (18a) that protrudes inward in a radial direction to sandwich the electromagnetic shielding members (12c to 14c) together with the underlay member (17) while being connected to the electromagnetic shielding members (12c to 14c), at an intermediate portion of the metal pipe (18) in the length direction.

The invention claimed is:

1. A wire harness comprising:

a plurality of shielded electric wires that each have a core wire and an electromagnetic shield that covers an outer circumference of the core wire;

a terminal where the plurality of core wires are connected to each other;

an insulative cover that covers an outer circumference of the terminal;

an underlay cover that covers an outer circumference of the insulative cover;

a metal pipe covering that covers an outer circumference of the underlay cover; and a water sealing plug interposed between an inner circumferential surface of an end of the metal pipe in a length direction and an outer circumferential surface of the shielded electric wires, wherein the metal pipe has a shielding connection portion that protrudes inward in a radial direction to sandwich the electromagnetic shields together with the underlay cover while being connected to the electromagnetic shields, at an intermediate portion of the metal pipe in the length direction.

2. The wire harness according to claim 1, wherein the underlay cover is installable from an outer side of the insulative cover.

3. The wire harness according to claim 2, wherein the underlay cover is flexible and has a C shape.

4. The wire harness according to claim 1, wherein the shielding connection portion forms a positioning portion that restricts movement of the water sealing plug toward an intermediate portion of the metal pipe in the length direction.

5. The wire harness according to claim 1, wherein the water sealing plug is a rubber plug.

6. The wire harness according to claim 1, further comprising a retainer that prevents dislodgement of the water sealing plug from the metal pipe.

7. The wire harness according to claim 1, wherein the metal pipe has a retaining portion that protrudes inward in a radial direction on an end side of the metal pipe relative to the water sealing plug in the length direction and prevents dislodgement of the water sealing plug from the metal pipe.

\* \* \* \* \*